US 6,523,497 B2

United States Patent
Smith

(10) Patent No.: US 6,523,497 B2
(45) Date of Patent: Feb. 25, 2003

(54) RETICULATED FISH AGGREGATION APPARATUS

(76) Inventor: Jack D. Smith, 129 D-E Rd., Stanton, TN (US) 38069

(*) Notice: Subject to any disclaimer, the term of this patent is extended or adjusted under 35 U.S.C. 154(b) by 0 days.

(21) Appl. No.: 09/736,483

(22) Filed: Dec. 13, 2000

(65) Prior Publication Data

US 2002/0069832 A1 Jun. 13, 2002

(51) Int. Cl.$^7$ ............................................. A01K 61/00
(52) U.S. Cl. ....................................... 119/221; 446/106
(58) Field of Search .......................... 119/207, 208, 119/217, 219, 221, 256, 263, 269; 405/23–25; 52/101; 428/12; 43/441; 446/105, 106, 108, 117, 124–126

(56) References Cited

U.S. PATENT DOCUMENTS

| | | | | |
|---|---|---|---|---|
| 2,142,371 A | * | 1/1939 | Peles | 119/903 |
| 3,323,310 A | * | 6/1967 | Arpin | 405/24 |
| 3,898,958 A | * | 8/1975 | Pranis, Jr. | 119/221 |
| 4,439,058 A | * | 3/1984 | Le Mehaute | 405/24 |
| 4,471,552 A | | 9/1984 | McIntosh et al. | 43/4 |
| 4,727,672 A | | 3/1988 | Hill et al. | 43/4 |
| 4,916,845 A | | 4/1990 | Aydelette, Sr. | 43/4 |
| 4,947,791 A | | 8/1990 | Laier et al. | 119/3 |
| 4,993,362 A | | 2/1991 | Jimbo | 119/3 |
| 5,109,796 A | * | 5/1992 | Monus | 119/221 |
| 5,180,323 A | * | 1/1993 | Justice | 446/105 |
| 5,201,136 A | | 4/1993 | LaMorte et al. | 43/4 |
| 5,272,829 A | | 12/1993 | Roberts et al. | 43/4 |
| 5,400,552 A | * | 3/1995 | Negre | 52/101 |
| 5,555,670 A | | 9/1996 | Troutman, Jr. | 43/44.99 |

FOREIGN PATENT DOCUMENTS

| | | | | |
|---|---|---|---|---|
| DE | 43 00 154 A1 | * | 7/1994 | A01M/29/00 |
| GB | 2 249 013 A | * | 4/1992 | A01M/29/00 |

* cited by examiner

*Primary Examiner*—Charles T. Jordan
*Assistant Examiner*—Kimberly S Smith
(74) *Attorney, Agent, or Firm*—John D. Gugliotta; P. Jeff Martin

(57) ABSTRACT

A submersible artificial fish bed is provided formed of hollow members that are self flooded in order to be placed.

4 Claims, 5 Drawing Sheets

RETICULATED FISH AGGREGATION APPARATUS

RELATED APPLICATIONS

The present invention was first described in Disclosure Document No. 478,179 filed on Aug. 9, 2000. There are no previously filed, nor currently any co-pending applications, anywhere in the world.

BACKGROUND OF THE INVENTION

1. Field of the Invention

The present invention relates generally to artificial structures for attracting fish and, more particularly, to a reticulated fish aggregation apparatus.

2. Description of the Related Art

Fish that live in natural environments such as lakes, streams, oceans, and rivers, can usually be found around the protective cover of rocks, coral, plant life and the like. However, many of these habitats have been destroyed by natural phenomena such as hurricanes, floods, and the like. Additionally man made problems such as pollutants, dams and other developmental issues have claimed their fair share of these habitats as well. This loss of habitats has led to entire species being lost from certain bodies of waters, thus further affecting other organisms in the food chain. Even fishermen, who at one time would frequent certain fishing spots, would stop their visits, thus affecting local business cycles as well.

Accordingly, there exists a need for a means by which fish habitats can be replaced or created in a manner which is quick, easy and effective. The development of the reticulated fish aggregation apparatus fulfills this need.

A search of the prior art did not disclose any patents that read directly on the claims of the instant invention; however, the following references were considered related. The following patents disclose an artificial fish bed or reef system: U.S. Pat. No. 5,201,136 issued in the name of La Morte et al.; U.S. Pat. No. 4,993,362 issued in the name of Jimbo; and U.S. Pat. No. 4,947,791 issued in the name of Laier et al.

The following patents describe a fish aggregating system in an anchored or floating mode: U.S. Pat. No. 4,916,845 issued in the name of Aydelette, Sr. et al.; U.S. Pat. No. 4,727,672 issued in the name of Hill et al.; and U.S. Pat. No. 4,471,552 issued in the name of McIntosh et al.

U.S. Pat. No. 5,555,670 issued in the name of Troutman et al. discloses a submersible object with a bait compartment for attracting fish.

U.S. Pat. No. 5,272,829 issued in the name of Roberts et al. describes a fish attracting basin stump.

Consequently, a need has been felt for providing a device which replaces or creates fish habitats in a manner which is quick, easy and effective.

SUMMARY OF THE INVENTION

Therefore, it is an object of the present invention to provide a fish habitat which provides an artificial habitat for fish.

It is another object of the present invention to provide a fish habitat which encourages the growth of other marine life and provides protection from predators.

It is still another object of the present invention to provide a fish habitat which allows fish to feed.

It is still another object of the present invention to provide a fish habitat which can be made in a multitude of shapes and sizes.

It is another object of the present invention to provide an artificial fish habitat with a base made of large diameter PVC pipe.

It is another object of the present invention to provide an artificial fish habitat with a base being approximately four feet square.

It is another object of the present invention to provide an artificial fish habitat with a base which rests on a lake, a river, an ocean, or a stream bottom.

It is another object of the present invention to provide an artificial fish habitat with a base which can be easily moved if desired.

It is another object of the present invention to provide an artificial fish habitat with 32 splines; sectioned as 4 rows of 8 splines.

It is another object of the present invention to provide an artificial fish habitat with splines which are secured to the base via semi-interference type fit, thereby allowing fish to weave in and out.

It is another object of the present invention to provide an artificial fish habitat which can be used to replace natural habitats that were destroyed.

Briefly described according to one embodiment of the present invention, a reticulated fish aggregation apparatus is disclosed for providing an artificial habitat for fish seeking refuge from predators or seeking other fish or food to eat.

The present invention is comprised of PVC piping arranged in a grid pattern approximately four feet square. From this grid pattern a series of 32 smaller PVC pipes, one-half inch in diameter and four feet long, extend upward, forming a series of upright splines. The invention can also be made in a variety of other shapes and sizes as well. The entire invention is lowered to the bottom of a lake, stream, pond or other similar body of water. The splines form an artificial habitat or shield for any fish who may be seeking refuge from predators or seeking other fish or food to eat. Such artificial habitats can also be used to the advantage of fishermen who are looking for the areas where fish tend to congregate.

The use of the present invention provides fish an artificial habitat in areas where none exist.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENT

1. Detailed Description of the Figures

Figure 1:
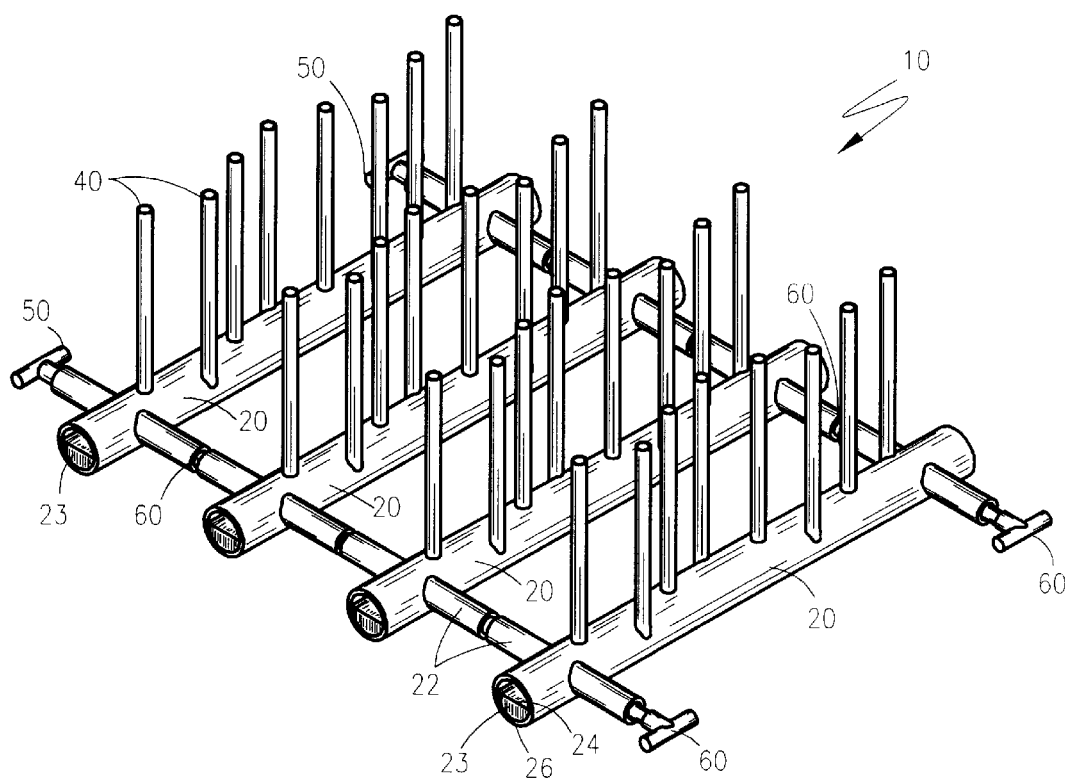
FIG. 1 is a perspective view of a reticulated fish aggregation apparatus according to the preferred embodiment of the present invention.

Referring now to FIGS. 1–5, a reticulated fish aggregation apparatus 10 is shown, according to the present invention, comprised of a plurality of linearly elongated, cylindrical ballast members 20, a plurality of cylindrical, T-shaped fasteners 50, and a plurality of linearly elongated cylindrical splines 40 forming a generally 4 feet square grid-like structure for providing an artificial habitat for fish seeking refuge from predators or seeking other fish or food to eat. In the preferred embodiment, four ballast members 20 are constructed of PVC material, wherein each ballast member 20 is of a linearly elongated, cylindrical configuration formed with integral, opposed stems 22, positioned perpendicularly with respect to the ballast member 20 near each end thereof. Such design affords each ballast member 20 with T-shaped ends, wherein the stems 22 thereof are positioned parallel with respect to each other. The materials utilized in fabricating the present invention is intended merely as a suggestion, and other materials such as a rigid plastic material may be employed.

It is envisioned that the length of each ballast member 20 measures approximately 4 feet in length with a diameter measuring approximately 3 inches. Each ballast member 20 includes semi-open ends, wherein each end is formed with an integral semi-enclosure 23 extending from an equatorial line thereof, depicted by line 24, to a lower lip 26 of each end of each ballast member 20. The ballast members 20 serve to anchor and stabilize the present invention.

The stems 22 forming the T-shaped ends of each ballast member 20 are envisioned as having open ends with a length measuring approximately 4.5 inches and a diameter measuring approximately 0.75 inches.

Figure 3:
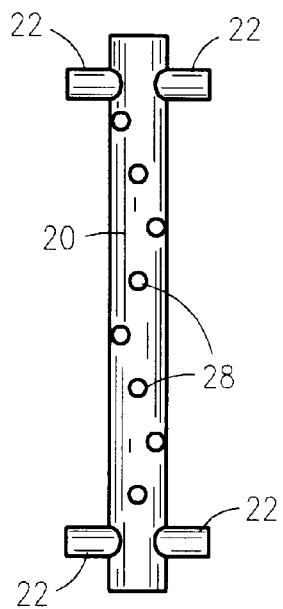
FIG. 3 is a top plan enlarged view of a ballast member according to the preferred embodiment of the present invention.

Referring now more specifically to FIG. 3, a plurality of spline receiving holes 28 are formed at irregular intervals along an upper external circumferential surface of each ballast member 20. Each spline receiving hole 28 is designed so as to receive in a semi-interference type fit a linearly elongated, cylindrical spline 40, removably held therein by physical friction.

Referring now to FIGS. 1, 2, 4, and 5, each spline 40 is of a linearly elongated, cylindrical configuration constructed of PVC material and has open ends. It is envisioned that each spline has a length measuring approximately 4 feet, and a diameter of approximately 0.5 inches.

Once inserted into the spline receiving holes 28, the splines 40 extend upwardly from the ballast member 20 in a secured fashion thereby forming a series of splines 40 vertically erected at irregular intervals.

Figure 2:
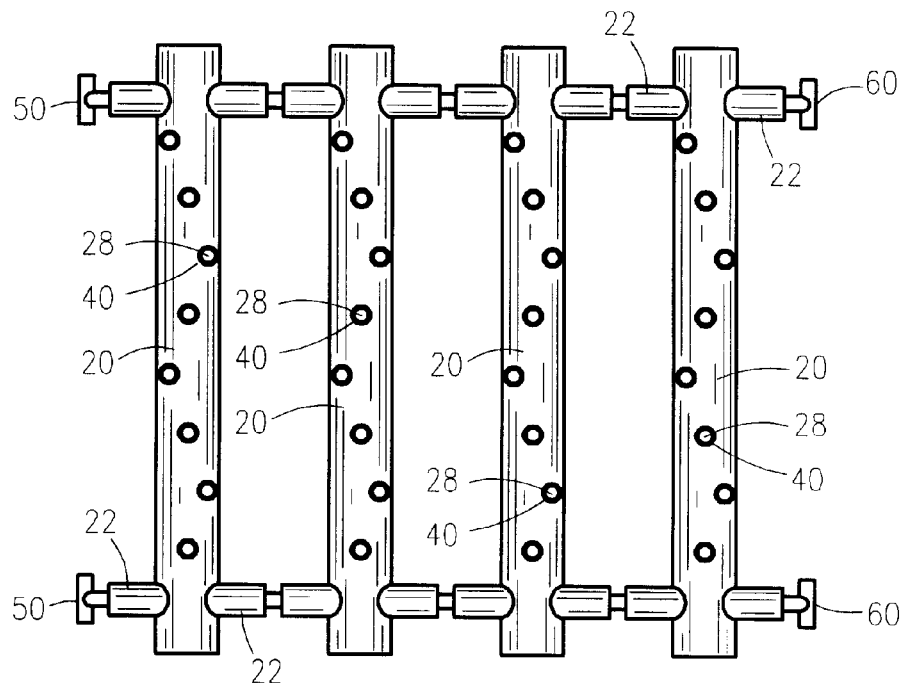
FIG. 2 is a top plan view thereof.
Figure 4:
FIG. 4 is a perspective view a T-shaped fastener according to the preferred embodiment of the present invention.
Figure 5:
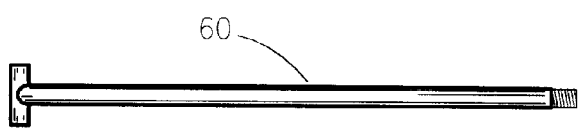
FIG. 5 is a side elevational view of a ballast connecting member according to the preferred embodiment of the present invention.
Figure 6A:
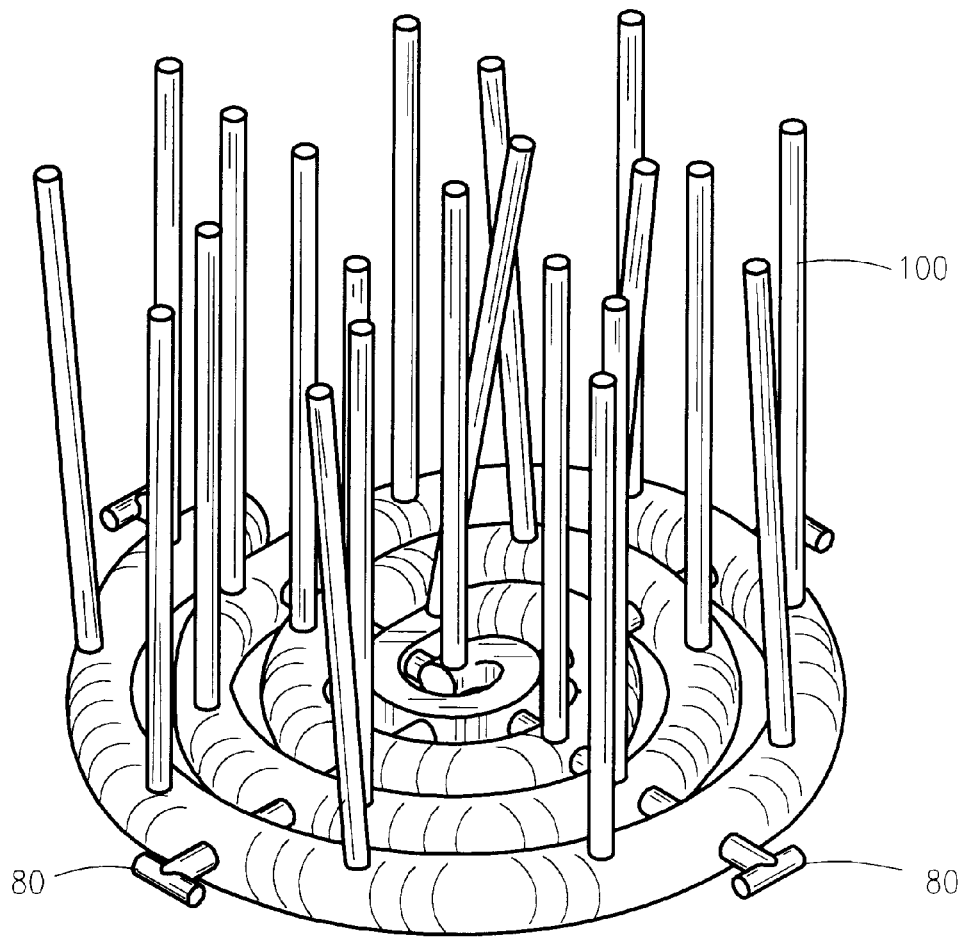
FIG. 6a is a perspective view of a first alternate embodiment of the present invention shown in-use.
Figure 6B:
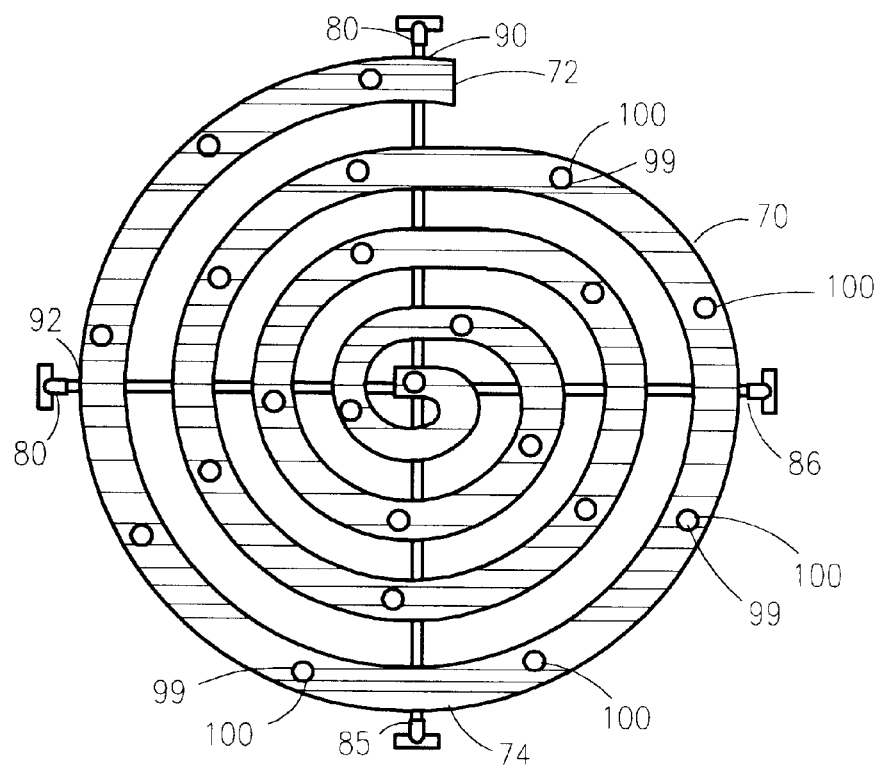
FIG. 6b is a top plan view thereof.
Figure 6C:
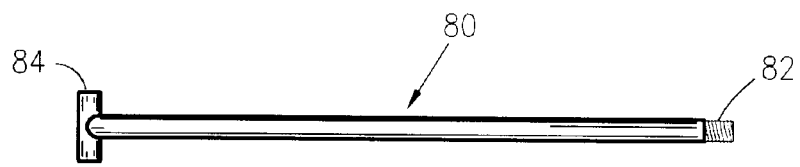
FIG. 6c is a side elevational view of a cylinder securement member according to the first alternate embodiment of the present invention.
Figure 6D:
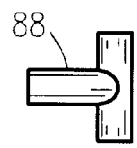
FIG. 6d is a side elevational view of a T-shaped fastener according to the first alternate embodiment of the present invention.

Referring now more specifically to FIGS. 2, 4 and 5, in order to removably connect the four ballast members 20, each of a plurality of threaded T-shaped fasteners 50, constructed of PVC material, are inserted within an outer upper and an outer lower stem 22 of a single ballast member 20. The fasteners 50 are mounted to the stems 22 by glue typically employed when mounting PVC material. The remaining ballast members 20 are adjacently aligned in a parallel series in such fashion whereby the ballast member 20 with fasteners 50 mounted thereto, is positioned as the outermost ballast member 20, with the fasteners 50 positioned opposed to an adjacent ballast member 20. Once the ballast members 20 are properly aligned in parallel series, each of a plurality of linearly elongated, cylindrical ballast connecting members 60 having a T-shaped end opposite a threaded end, is inserted threaded end first, starting with the outermost ballast member 20 in the series opposite the ballast member 20 with mounted fasteners 50, within each stem 22 of each adjacent ballast member 20 until reaching the fastener 50.

Each fastener 50 threadably receives each ballast connecting member 60 thereby allowing each ballast connecting member 60 to be removably coupled to each fastener 50. The T-shaped design of the ballast connecting member 60 provides a user with an easily grippable handle for facilitating the removable connection of each ballast member 20 to each fastener 50, and further provides a device being easily assembled and disassembled.

Referring now to FIGS. 1, 2, 4, and 5, once the ballast members 20 are connected in parallel series, the user then inserts and secures the plurality of splines 40 within the spline receiving holes 28. It should be noted that the operation stated heretofore is meant only as a suggestion and may be adapted at the option of the user. Thus, if desired, the user may insert the splines 40 within the spline receiving holes 28 before removably connecting the four ballast members 20 in the parallel aligned series.

At this point, the present invention is submerged within the bottom of a lake, stream, pond, or other similar body of water thereby providing an artificial habitat for the congregation of fish in areas where natural habitats fail to exist.

Referring now to FIGS. 6a–6d, a first alternate embodiment of the present invention is shown comprised of a linearly elongated, plastic cylinder 70 having an anterior end 72 opposite a posterior end 74. The cylinder 70 is preferably constructed of corrugated plastic typically utilized as drain lines, and measures approximately 25 feet in length with a diameter measuring approximately 4 inches. The cylinder 70 is tightly coiled to a spiral configuration, and is held in such position by two cylinder securement members 80, wherein each securement member 80 has a threaded end 82 opposite a T-shaped end 84. Each cylinder securement member 80 is of a linearly elongated, cylindrical configuration constructed of PVC material, and has a diameter measuring approximately 0.5 inches.

A first hole 90 is drilled into and extends linearly from the anterior end 72 of the cylinder 70 through each external circumferential sidewall piercing the internal circumferential sidewall, and progressing through each external and internal circumferential sidewall which follows in the spirally configured cylinder through the external circumferential sidewall at the posterior end 74 of the cylinder 70.

A second hole 92 is drilled into the external circumferential sidewall of the cylinder 70 angularly positioned 90° from the anterior end 72 thereof, and extends linearly therefrom transversely and perpendicularly with respect to a linear axis formed by the first hole 90, through each external and internal circumferential sidewall which progressively follows in the spirally configured cylinder 70.

In order to securably maintain the cylinder 70 in such spiral position, a cylinder securement member 80 is inserted within the first hole 90 at the anterior end 72 of the cylinder 70, threaded end first, linearly through the sidewalls, and through the posterior end 74 thereof. A cylinder securement member 80 is then inserted through the second hole 92, threaded end first, linearly through the sidewalls, and through a last hole formed in the external circumferential sidewall of the cylinder 70 transversely and perpendicularly with respect to the cylinder securement member 80 inserted within the first hole 90. Each cylinder securement member 80 is of a length such that the threaded end 82 thereof protrudes from an exit point 85, 86 of the first and second holes 90, 92 respectively.

A plurality of T-shaped, threaded fasteners 88 constructed of PVC material are threadably received by the threaded end 82 of each cylinder securement member 80, thereby removably securing the fasteners 88 to the cylinder securement members 80 and facilitating the maintenance of the cylinder 70 in its tightly coiled configuration.

The T-shaped ends 84 of each cylinder securement member 88 mechanically interferes with an external circumferential sidewall of an entry point, depicted as holes 90, 92 of the cylinder 70, thus preventing the complete entry of the cylinder securement member 80 within the holes 90, 92.

The T-shaped design of each fastener 88 provides a user with an easily grippable handle for facilitating the removable connection thereof to each cylinder securement member 80, and further provides a device being easily assembled and disassembled.

A plurality of spline receiving holes 99 are drilled in an upper external circumferential surface of the cylinder 70, aligned in a circular series such that each spline receiving hole 99 is preferably separated by a distance of approximately 12 inches. Each spline receiving hole 99 is designed so as to receive in a semi-interference type fit a linearly elongated, cylindrical spline 100, removably held therein by physical friction. Each spline 100 is constructed of PVC material and has open ends. It is envisioned that each spline 100 has a length measuring approximately 4 feet, and a diameter of approximately 0.5 inches. Once inserted into the spline receiving holes 99, the splines 100 extend vertically from the cylinder 70 in a secured fashion thereby forming a circular series of vertically extending splines 100.

At this point, the first alternate embodiment of the present invention is submerged within the bottom of a lake, stream, pond, or other similar body of water thereby providing an artificial habitat for the congregation of fish in areas where natural habitats fail to exist.

Figure 7:
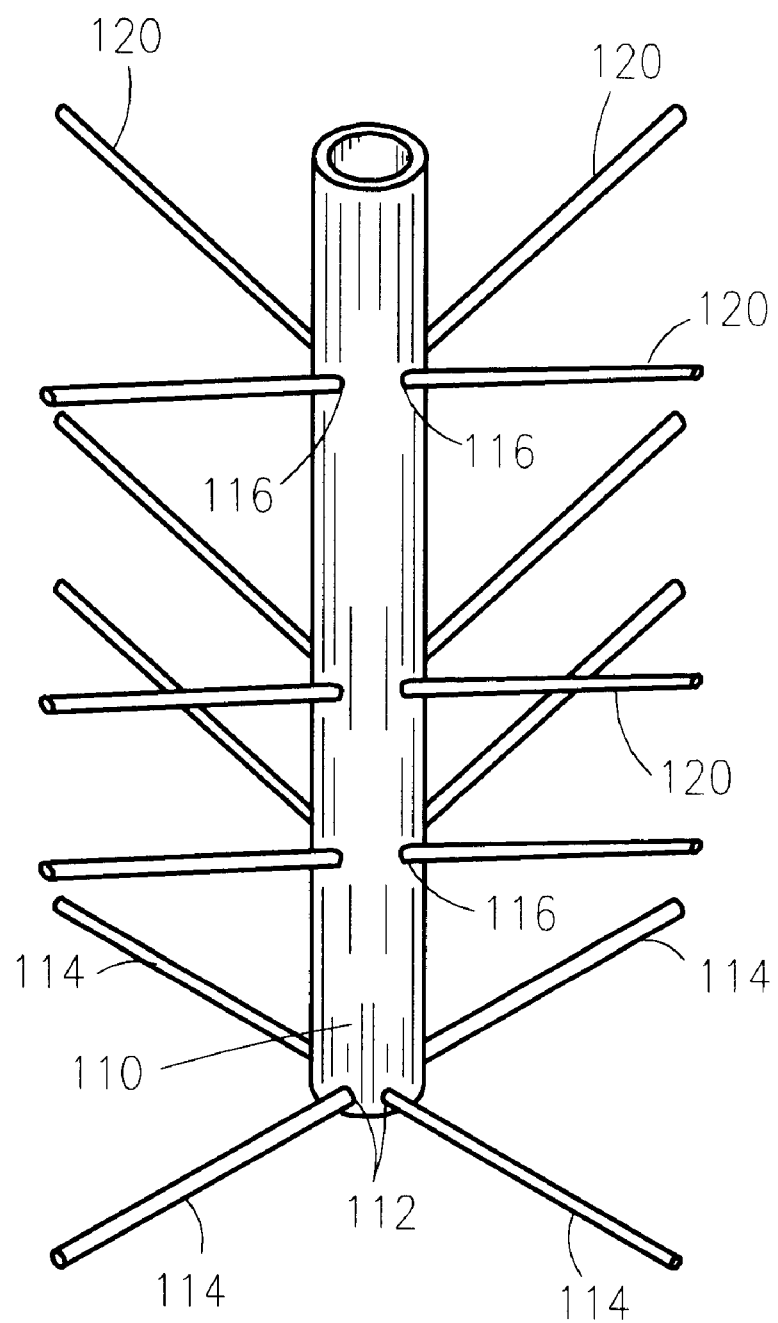
FIG. 7 is a perspective view of a second alternate embodiment of the present invention shown in-use.

Referring now to FIG. 7, a second alternate embodiment of the present invention is shown, comprised of a linearly elongated, cylindrical upright member 110 with open ends constructed of PVC material and has a length measuring approximately 5 feet and a diameter measuring approximately 4 inches.

A plurality of stabilizing member receiving holes 112 are formed near a lower end of the upright member 110 along an external circumferential surface thereof, spaced equidistant, circumferentially therearound. Each hole 112 is designed and configured so as to receive in a semi-interference type fit a linearly elongated, cylindrical stabilizing member 114 with open ends, removably held therein by physical friction. It is envisioned that each stabilizing member 114 has a length measuring 7 feet and a diameter measuring 0.5 inches. The stabilizing members 114 serve to ensure stabilization of the second alternate embodiment in an upright position.

The upright member 110 is further defined as having a plurality of spline receiving holes 116 drilled along an external circumferential surface thereof at irregular intervals from the lower end thereof above the stabilizing members 114 to an upper end thereof. Each hole 116 is designed and configured so as to receive in a semi-interference type fit a linearly elongated cylindrical spline 120 with open ends, removably held therein by physical friction. Each hole 116 is further configured so as to frictionally hold each spline 120 at an upward directed angle of approximately 45°. It is envisioned that splines 120 of various lengths would be utilized, thereby providing an upright member 110 with various sized splines 120, each extending vertically and circumferentially therefrom at approximately 45°. It is further envisioned that the splines 120 would measure variably between 1 to 4 feet in length.

At this point, the second alternate embodiment of the present invention is submerged within the bottom of a lake, stream, pond, or other similar body of water thereby providing an artificial habitat for the congregation of fish in areas where natural habitats fail to exist.

It should be noted that attention to state and federal wildlife rules and regulations prohibiting the use of such an apparatus as the present invention in particular bodies of water should be carefully observed and adhered to.

2. Operation of the Preferred Embodiment

To use the present invention, first, the user adjacently aligns the ballast members 20 in a parallel series. Next, in order to removably connect the four ballast members 20, the user inserts each of a plurality of threaded T-shaped fasteners 50 within an outer upper and an outer lower stem 22 of a single ballast member 20. The user then mounts the fasteners 50 to the stems 22 by glue typically employed when mounting PVC material. Next, the user adjacently aligns the remaining ballast members 20 in a parallel series in such fashion whereby the ballast member 20 with fasteners 50 mounted thereto, is positioned as the outermost ballast member 20, with the fasteners 50 positioned opposed to an adjacent ballast member 20. Once the ballast members 20 are properly aligned in parallel series, the user inserts each cylindrical ballast connecting member 60 threaded end first, starting with the outermost ballast member 20 in the series opposite the ballast member 20 with mounted fasteners 50, within each stem 22 of each adjacent ballast member 20 until reaching the fastener 50. Each fastener 50 threadably receives each ballast connecting member 60 thereby allowing each ballast connecting member 60 to be removably coupled to each fastener 50.

Once the ballast members 20 are connected in parallel series, the user then inserts and secures the plurality of splines 40 within the spline receiving holes 28.

Finally, the user submerges the present invention within the bottom of a lake, stream, pond, or other similar body of water thereby providing an artificial habitat for the congregation of fish in areas where natural habitats fail to exist.

The use of the present invention provides fish an artificial habitat in areas where none exist.

Therefore, the foregoing description is included to illustrate the operation of the preferred embodiment and is not meant to limit the scope of the invention. As one can envision, an individual skilled in the relevant art, in conjunction with the present teachings, would be capable of incorporating many minor modifications that are anticipated within this disclosure. Therefore, the scope of the invention is to be broadly limited only by the following claims.

What is claimed is:

1. A reticulated fish aggregation apparatus comprising:
   a plurality of linearly elongated, cylindrical ballast members;
   a plurality of linearly elongated cylindrical splines extending upward from each cylindrical ballast member wherein each said ballast member is of a linearly elongated, cylindrical configuration formed with integral, opposed stems positioned perpendicularly with respect to the ballast member near each end thereof such as to afford each ballast member with T-shaped ends, wherein the stems thereof are positioned parallel with respect to each other; and a plurality of cylindrical, T-shaped fasteners for affixing together said ballast members to form a generally square grid-like structure for providing an artificial habitat for fish.

2. The reticulated fish aggregation apparatus of claim 1, wherein each ballast member includes semi-open ends, wherein each end is formed with an integral semi-enclosure extending from an equatorial line thereof to a lower lip of each end of each ballast member.

3. A reticulated fish aggregation apparatus comprising:

a plurality of linearly elongated, cylindrical ballast members;

a plurality of linearly elongated cylindrical splines extending upward from each cylindrical ballast member;

a plurality of cylindrical, T-shaped fasteners for affixing together said ballast members to form a generally square grid-like structure for providing an artificial habitat for fish; and a plurality of spline receiving holes formed at irregular intervals along an upper external circumferential surface of each ballast member, each spline receiving hole receiving in a semi-interference type fit a linearly elongated, cylindrical spline, removably held therein by physical friction.

4. A reticulated fish aggregation apparatus comprising:

a plurality of linearly elongated, cylindrical ballast members;

a plurality of linearly elongated cylindrical splines extending upward from each cylindrical ballast member; and a plurality of cylindrical, T-shaped fasteners for affixing together said ballast members to form a generally square grid-like structure for providing an artificial habitat for fish; wherein in order to removably connect said ballast members each of a plurality of threaded T-shaped fasteners are inserted within an outer upper and an outer lower stem of a single ballast member, the remaining ballast members thereby are adjacently aligned in a parallel series whereby the ballast member with fasteners mounted thereto, is positioned as the outermost ballast member, with the fasteners positioned opposed to an adjacent ballast member, and once said ballast members are properly aligned in parallel series, each of a plurality of linearly elongated, cylindrical ballast connecting members having a T-shaped end opposite a threaded end is inserted threaded end first, starting with the outermost ballast member in the series opposite the ballast member with mounted fasteners, within each stem of each adjacent ballast member until reaching the fastener.

\* \* \* \* \*